(12) United States Patent
Liao et al.

(10) Patent No.: US 9,195,017 B2
(45) Date of Patent: Nov. 24, 2015

(54) OPTICAL MODULE AND OPTICAL TRANSCEIVER MODULE

(71) Applicant: DELTA ELECTRONICS, INC., Taoyuan County (TW)

(72) Inventors: Yu-Hsien Liao, Taoyuan County (TW); Ming-Yi Huang, Taoyuan County (TW); Te-Hsuan Yang, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 133 days.

(21) Appl. No.: 13/912,619

(22) Filed: Jun. 7, 2013

(65) Prior Publication Data
US 2014/0294400 A1 Oct. 2, 2014

(30) Foreign Application Priority Data
Apr. 1, 2013 (TW) .............................. 102111773 A

(51) Int. Cl.
*H04B 10/40* (2013.01)
*G02B 6/42* (2006.01)

(52) U.S. Cl.
CPC .............. *G02B 6/4286* (2013.01); *H04B 10/40* (2013.01); *G02B 6/4214* (2013.01); *G02B 6/4246* (2013.01); *G02B 6/4255* (2013.01)

(58) Field of Classification Search
CPC .... H04B 10/40; G02B 6/4286; G02B 6/4214; G02B 6/4246; G02B 6/4255
USPC ................................................ 398/135–139
See application file for complete search history.

(56) References Cited

U.S. PATENT DOCUMENTS

| 6,198,864 | B1 * | 3/2001 | Lemoff et al. | 385/47 |
| 6,888,988 | B2 * | 5/2005 | Vancoille et al. | 385/47 |
| 6,901,221 | B1 * | 5/2005 | Jiang et al. | 398/138 |
| 6,959,133 | B2 * | 10/2005 | Vancoill et al. | 385/47 |
| 8,315,492 | B2 * | 11/2012 | Chen et al. | 385/33 |
| 8,335,411 | B2 * | 12/2012 | Kuznia et al. | 385/33 |
| 8,483,571 | B2 * | 7/2013 | McColloch et al. | 398/141 |
| 8,670,472 | B2 * | 3/2014 | Tatsuno et al. | 372/24 |
| 8,909,058 | B2 * | 12/2014 | Sheu | 398/139 |
| 2003/0118344 | A1 * | 6/2003 | Fujita et al. | 398/139 |

(Continued)

FOREIGN PATENT DOCUMENTS

| CN | 102103230 | 6/2011 |
| JP | H11-218638 | 8/1999 |

(Continued)

OTHER PUBLICATIONS

Office Action dated May 27, 2014 from corresponding No. JP 2013-114356.

(Continued)

*Primary Examiner* — Li Liu
(74) *Attorney, Agent, or Firm* — Hauptman Ham, LLP

(57) ABSTRACT

An optical module includes a first light-guide element, an optical element, a first optical fiber, and a beam splitter. The first light-guide element includes a first surface and a second surface. The optical element corresponds to the first surface. The first optical fiber is contacted with the second surface. The beam splitter is attached to the first surface, the beam splitter partially reflects and partially transmits a light beam striking thereon. A refractive index of the beam splitter is different from a refractive index of the first light-guide element.

17 Claims, 2 Drawing Sheets

(56) References Cited

U.S. PATENT DOCUMENTS

| | | | |
|---|---|---|---|
| 2004/0179784 A1* | 9/2004 | Vancoille et al. | 385/47 |
| 2004/0202477 A1* | 10/2004 | Nagasaka et al. | 398/138 |
| 2005/0185900 A1* | 8/2005 | Farr | 385/93 |
| 2005/0221505 A1* | 10/2005 | Petruno et al. | 436/524 |
| 2010/0195681 A1* | 8/2010 | Tatsuno et al. | 372/24 |
| 2010/0272403 A1* | 10/2010 | Chen et al. | 385/93 |
| 2012/0002284 A1* | 1/2012 | McColloch et al. | 359/558 |
| 2012/0063721 A1* | 3/2012 | Chen | 385/33 |
| 2012/0063725 A1* | 3/2012 | Meadowcroft et al. | 385/88 |
| 2014/0072311 A1* | 3/2014 | Giziewicz et al. | 398/135 |
| 2014/0226988 A1* | 8/2014 | Shao et al. | 398/139 |
| 2014/0314422 A1* | 10/2014 | Shao et al. | 398/138 |

FOREIGN PATENT DOCUMENTS

| | | |
|---|---|---|
| JP | 2005-18006 | 1/2005 |
| JP | 2006-520491 | 9/2006 |
| JP | 2012-78607 | 4/2012 |
| JP | 2012-194372 | 10/2012 |
| JP | 2012-194454 | 10/2012 |
| TW | M241892 | 8/2004 |
| TW | M445187 | 1/2013 |
| TW | M445190 | 1/2013 |

OTHER PUBLICATIONS

Office Action dated Jun. 25, 2014 from corresponding No. KR 10-2013-0062891.

Office Action dated Aug. 1, 2014 from corresponding No. TW 102111773.

Office Action dated May 22, 2015 from corresponding No. CN 201310112360.6.

* cited by examiner

OPTICAL MODULE AND OPTICAL TRANSCEIVER MODULE

BACKGROUND OF THE INVENTION

1. Field of the Invention

The present invention relates to an optical module and an optical transceiver module, and in particular to an optical module and an optical transceiver using

2. Description of Related Art

Fiber-optic communication is a way for transmitting information by using light and optical fiber, which is belonging to a wire communication and has advantages of high transmission capacity and safety, and is progressively becoming a main wire communication way.

In the past, laser diode with transistor outline can (TO can) package is widely used in optical fiber communication. However, laser diode with TO can package is just perpendicularly disposed on a circuit board, such that optical coupled difficulty is increase when coupling a light beam emitted from the laser diode into an optical fiber, and partially light beam lost when coupling the light beam into the laser diode.

Besides, the TO can package is usually made of metallic material, such that the manufacturing cost is expansive and the volume cannot be effectively minimized.

SUMMARY OF THE INVENTION

It is an object of the present invention to provide an optical module.

It is another object of the present invention to provide an optical transceiver module.

Accordingly, the optical module includes a first light-guide element, an optical element, a first optical fiber, and a beam splitter. The first light-guide element includes a first surface and a second surface. The optical element corresponds to the first surface. The first optical fiber is contacted with the second surface. The beam splitter is attached to the first surface. The beam splitter partially reflects and partially transmits a light beam striking thereon. A refractive index of the beam splitter is different from a refractive index of the first light-guide element.

In an embodiment of the present invention, the optical module further comprises an optical combining structure disposed between the first light-guide element and the beam splitter, the optical combining structure is used for fastening the beam splitter on the first light-guide element.

In an embodiment of the present invention, the optical module further comprises a micro optical sensor for sensing a transmitting light beam transmitting through the beam splitter.

In an embodiment of the present invention, wherein the refractive index of the first light-guide element is between 1.12 and 2.08.

In an embodiment of the present invention, wherein the beam splitter is a filtering plate, an optical film, an optical resin or an optical cement.

In an embodiment of the present invention, wherein a light emitting surface of the beam splitter comprises a plurality of micro-structures.

In an embodiment of the present invention, wherein a protrusion portion is formed on the first surface, the optical element corresponds to the protrusion portion.

In an embodiment of the present invention, wherein a recess is formed on the first surface, the beam splitter is contacted with the recess.

Accordingly, the optical transceiver module comprises an optical module. The optical module comprises a first light-guide element, an optical element, a first optical fiber, and a beam splitter. The first light-guide element comprises a first surface and a second surface. The optical element corresponds to the first surface, and the optical element is a light emitting element. The first optical fiber is contacted with the second surface. The beam splitter is attached to the first surface. The beam splitter partially reflects and partially transmits a light beam striking thereon. A refractive index of the beam splitter is different from a refractive index of the first light-guide element. A second light-guide element combines with the first light-guide element. A second optical fiber corresponds to the second light-guide element for propagating an external light beam into the second light-guide element. A light receiving element corresponds to the second light-guide element. The light receiving element is configured of receiving the external light beam.

In an embodiment of the present invention, wherein the first light-guide element and the second light-guide element are in one-piece form or the first light-guide element and the second light-guide element are combined by connecting to each other.

In an embodiment of the present invention, the optical transceiver module further comprises an optical combining structure disposed between the first light-guide element and the beam splitter, the optical combining structure is used for fastening the beam splitter on the first light-guide element.

In an embodiment of the present invention, the optical transceiver module further comprises a micro optical sensor for sensing a transmitting light beam transmitting through the beam splitter.

In an embodiment of the present invention, wherein the refractive index of the first light-guide element is between 1.12 and 2.08.

In an embodiment of the present invention, wherein the beam splitter is a filtering plate, an optical film, an optical resin or an optical cement.

In an embodiment of the present invention, wherein a light emitting surface of the beam splitter comprises a plurality of micro-structures.

In an embodiment of the present invention, wherein a protrusion portion is formed on the first surface, the optical element corresponds to the protrusion portion.

In an embodiment of the present invention, wherein a recess is formed on the first surface, the beam splitter is contacted with the recess.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
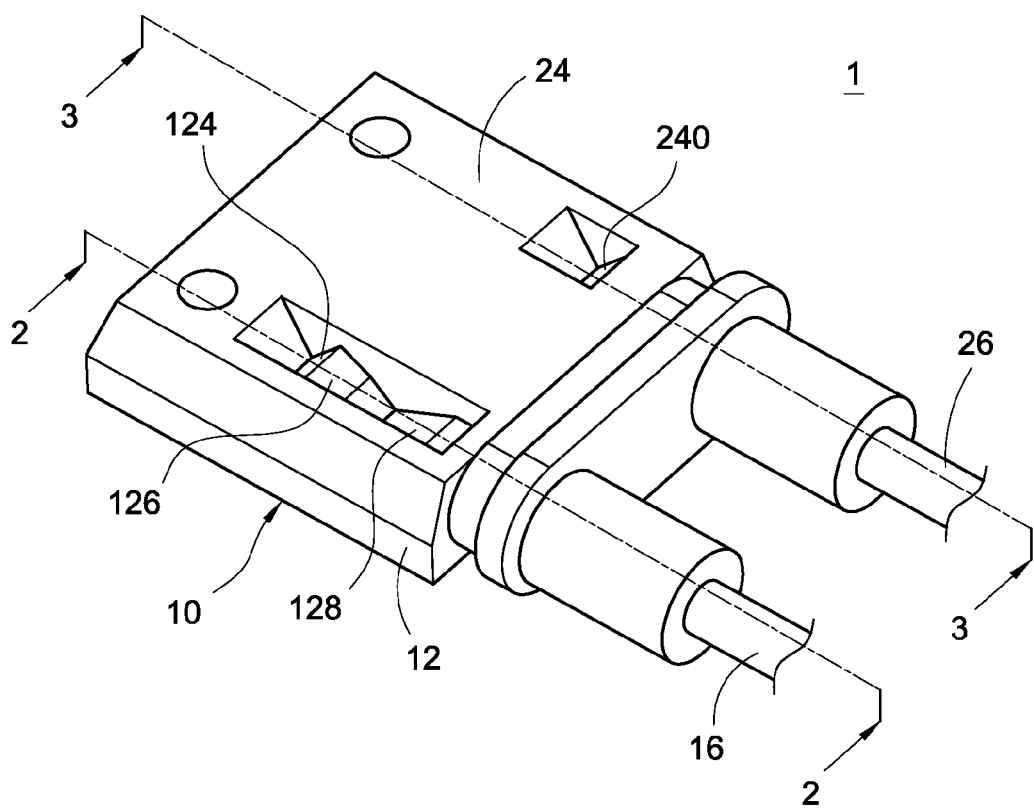
FIG. 1 is a perspective view of an optical transceiver module according to the present invention.
Figure 2:
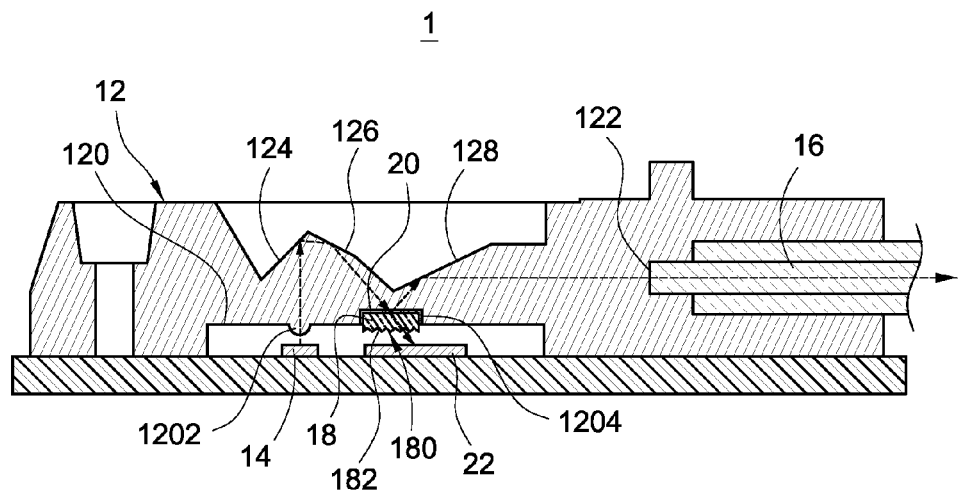
FIG. 2 is a sectional view of the optical transceiver module on line 2-2 shown in FIG. 1.
Figure 3:
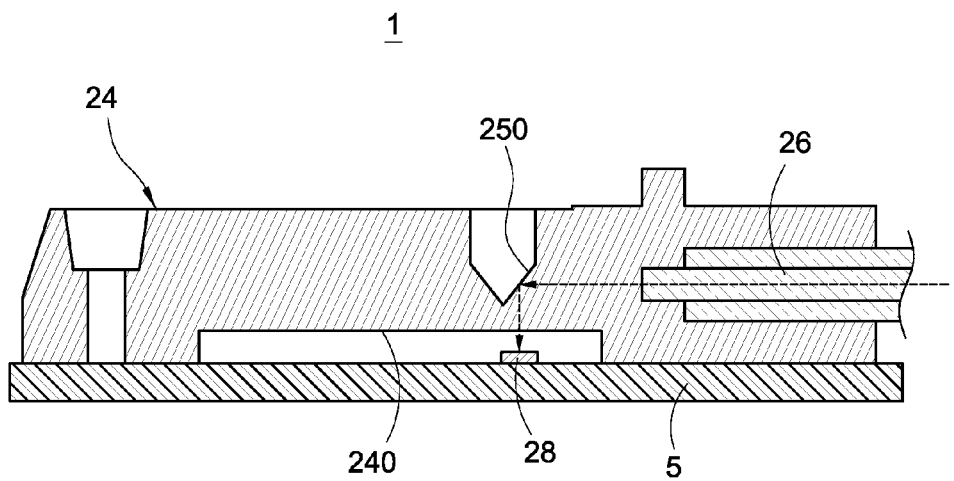
FIG. 3 is a sectional view of the optical transceiver module on line 3-3 shown on FIG. 1.

Referred is made to FIG. 1 and FIG. 2, FIG. 1 is a perspective view of an optical transceiver module according to the present invention, and FIG. 2 is a sectional view of the optical transceiver module on line 2-2 shown on FIG. 1. The optical transceiver module 1 includes an optical module 10. The optical module 10 includes a first light-guide element 12, an optical element 14, a first optical fiber 16, and a beam splitter 18.

A refractive index of the first light-guide element 12 is preferably between 1.12 and 2.08. The first light-guide element 12 includes a first surface 120 faced to a first direction and a second surface 122 faced to a second direction different from the first direction. The first direction is different from the second direction. The first surface 120 includes a protrusive portion 1202 and a recess 1204 formed thereon.

The first light-guide element 12 of an exemplary embodiment of the present invention further includes a first total internal reflection surface 124, a second total internal reflection surface 126, and a third total internal reflection surface 128. A facing direction of the first total internal reflection surface 124, the second total internal reflection surface 126, and the third total internal reflection surface 128 is different from the first direction.

The first total internal reflection surface 124 is designed for making an incident angle of a light beam emitted by the optical element 14 and striking the first total internal reflection surface 124 be larger than or equal to a critical angle of total internal reflection, such that total internal reflection is happening when the light beam emitted by the optical element 14 and entering the first light-guide element 12 strikes the first total internal reflection surface 124.

The second total internal reflection surface 126 is designed for making an incident angle of a light beam total internal reflected on the first internal reflection surface 124 and striking to the second total internal reflection surface 126 be larger than or equal to the critical angle of total internal reflection, such that total internal reflection is happening when the light beam total internal reflected by the first total internal reflection surface 124 strikes the second total internal reflection surface 126. In this embodiment, the second total internal reflection surface 126 is adjoined to the first total internal reflection surface 124.

The third total internal reflection surface 128 is designed for making an incident angle of a light beam reflected by the beam splitter 18 and striking the third total internal reflection surface 128 be larger than or equal to the critical angle of total internal reflection, such that total internal reflection is happening when the light beam total internal reflected by the second total internal reflection surface 128 strikes the third total internal reflection surface 128, and the light beam total internal reflected by the third total internal reflection surface 128 is then propagating to the second surface 122.

The optical element 14 corresponds to the first surface 120. In particularly, the optical element 14 corresponds to the protrusive portion 1202. The optical element 14 can be a light emitting element configured of emitting a light beam or a light receiving element configured of receiving a light beam. A diverging light beam emitted by the optical element 14 is collimated by the protrusive portion 1202 to form collimated beam when the optical element 14 is a light emitting element. A light beam transmitting from the first light-guide element 12 to the optical element 14 is focused on the optical element 14 by the protrusion portion 1202 to form converging beam when the optical element is a light receiving element.

The first optical fiber 16 is contact with the second surface 122, such that the first optical fiber 16 is optically coupled to the first light-guide element 12.

The beam splitter 18 is attached on the first surface 120. In particularly, the beam splitter 18 is disposed in the recess 1204 formed on the first surface 120. A refractive index of the beam splitter 18 is different from the refractive index of the first light-guide element 12. The beam splitter 18 partially reflects and partially transmits a light beam striking thereon. The beam splitter 18 is a filtering plate, an optical film, an optical resin or an optical cement.

The optical module 10 further includes an optical combining structure 20 disposed between the first light-guide element 12 and the beam splitter 18. The optical combining structure 20 is used for fastening the splitting element 18 on the first light-guide element 12. The optical combining element 20 is, for example, optical cement, optical buckling structure which can tightly fasten the beam splitter 18 on the first light-guide element 12.

The optical transceiver module 10 further includes a micro optical sensor 22. The micro optical sensor 22 is configured of sensing a transmitting light beam transmitting through the beam splitter 18. The micro optical sensor 22 is, for example, charge-coupled device or complementary metal-oxide-semiconductor (CMOS) component. The beam splitter 18 includes a light emitting surface 180. The light emitting surface 180 includes a plurality of micro structures 182 which can scatter light beam passing therethrough, such that the sensing effect of the micro optical sensor 22 is enhanced.

In the exemplary embodiment, when the optical element 14 is a light emitting, the light beam emitted from the optical element 14 propagates within the first light-emitting element 12 via the protrusion portion 1202 and then propagates to the first total internal reflecting surface 124. The light beam is total internal reflected by the first total internal reflection surface 124 and then propagates to the second total internal reflection surface 126. After that, the light beam is total internal reflected by the second total internal reflection surface 126 and then propagates to the beam splitter 18. The beam splitter 18 partially reflects and partially transmits the light beam striking thereon, such that the light beam is split into a reflected beam and a transmitting beam. The reflected beam propagates to the third total internal reflection surface 128 and is total internal reflected by the third total internal reflection surface 128. After that, the reflected beam propagates to the second surface 122 and enters the first optical fiber 16 through the second surface 122. The transmitting beam propagates to the micro optical sensor 22 through the micro-structures 182.

When the optical element 14 is a light emitting element, a light beam received from the first optical fiber 16 propagates to the first light-guide element 12 through the second surface 122, and then propagates to the third total internal reflection surface 128. The light beam is total internal reflected by the third total internal reflection surface 128 and then propagates to the beam splitter 18. The beam splitter 18 partially reflects and partially transmits the light beam striking thereon, such that the light beam is split into a reflected beam and a transmitting beam. The reflected beam propagates to the second total internal reflection surface 126, and is total internal reflected by the second total internal reflection surface 126, such that the reflected beam propagates to the first total internal reflection surface 124. After that, the reflected beam is total internal reflected by the first total internal reflection surface 124, and then is focus on the optical element 14 by the protrusion portion 1202.

The light transceiver module 1 further includes a second light-guide element 24, a second optical fiber 26, and a light receiving element 28. The second optical fiber 26 is correspondingly disposed on the second light-guide element 24 for propagating an external light beam to the second light-guide element 24. The light receiving element 28 is corresponding to the second light-guide element 24. The light receiving element 28 is configured of receiving the external light beam.

A refractive index of the second light-guide element 24 is the same as the refractive index of the first light-guide element 12. However, the refractive index of the second light-guide element 24 can also be different from the refractive index of the first light-guide element 12. The second light-guide element 24 includes a third surface 240. The second light-guide element 24 is connected to the first light-guide element 12, and the third surface 240 and the first surface 120 are at the same level. The second light-guide element 24 and the first light-guide element 12 can be in one-piece form, however the second light-guide element 24 and the first light-guide element 12 can be combined by connecting to each other.

The second light-guide element 24 further includes a forth total internal reflection surface 250, the forth total internal reflection surface 250 is designed for making an incident angle of the external light beam propagated from the second optical fiber 15 and striking the forth total internal reflection surface 250 be larger than or equal to a critical angle of total internal reflection, such that total internal reflection is happening when the external light beam propagated from the second optical fiber 15 and entering the first light-guide element 12 strikes the forth total internal reflection surface 250. Therefore, the light receiving element 28 can receive the external light beam propagated from the second optical fiber 26 and entering the second light-guide element 24.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An optical module comprising:
   a first light-guide element comprising a first surface and a second surface;
   an optical element corresponding to the first surface, the optical element being configured to emit a first light beam into the first light-guide element;
   a first optical fiber contacted with the second surface, and
   a beam splitter attached to the first surface, the beam splitter being configured to split the first light beam into a second light beam and a third light beam, to reflect the second light beam, and to refract the third light beam, wherein
   a refractive index of the beam splitter is different from a refractive index of the first light-guide element,
   the first light-guide element, the optical element, and the beam splitter are positioned such that the first light-guide element is capable of reflecting the first light beam twice before the first light beam is split into the second light beam and the third light beam by the beam splitter, and
   the first light-guide element is configured to reflect the second light beam between the beam splitter and the first optical fiber.

2. The optical module in claim 1, further comprising an optical combining structure disposed between the first light-guide element and the beam splitter, the optical combining structure is used for fastening the beam splitter on the first light-guide element.

3. The optical module in claim 1, further comprising a micro optical sensor for sensing a transmitting light beam transmitting through the bean splitter.

4. The optical module in claim 1, wherein the refractive index of the first light-guide element is between 1.12 and 2.08.

5. The optical module in claim 1, wherein the beam splitter is a filtering plate, an optical film, an optical resin or an optical cement.

6. The optical module in claim 1, wherein a light emitting surface of the beam splitter comprises a plurality of microstructures.

7. The optical module in claim 1, wherein a protrusive portion is formed on the first surface, the optical element corresponds to the protrusive portion.

8. The optical module in claim 1, wherein a recess is formed on the first surface, the beam splitter is contacted with the recess.

9. An optical transceiver module comprising:
   an optical module comprising:
      a first light-guide element comprising a first surface and a second surface;
      an optical element corresponding to the first surface, the optical element being a light emitting element configured to emit a first light beam into the first light-guide element;
      a first fiber contacted with the second surface; and
      a beam splitter attached to the first surface, the beam splitter being configured to split the first light beam into a second light beam and a third light beam, to reflect the second light beam, and to refract the third light beam, wherein a refractive index of the beam splitter is different from a refractive index of the first light-guide element;
   a second light-guide element combining with the first light-guide element;
   a second fiber corresponding to the second light-guide element for propagating an external light beam into the second light-guide element; and
   a light receiving element corresponding to the second light-guide element, the light receiving element configured of receiving the external light beam,
   wherein
      the first light-guide element, the optical element, and the beam splitter are positioned such that the first light-guide element is capable of reflecting the first light beam twice before the first light beam is split into the second light beam and the third light beam by the beam splitter, and
      the first light-guide element is configured to reflect the second light beam between the beam splitter and the first optical fiber.

10. The optical transceiver module in claim 9, wherein the first light-guide element and the second light-guide element are in one-piece form or the first light-guide element and the second light-guide element are combined by connecting to each other.

11. The optical transceiver module in claim 9, further comprising an optical combining structure disposed between the first light-guide element and the beam splitter, the optical combining structure is used for fastening the beam splitter on the first light-guide element.

12. The optical transceiver module in claim 9, further comprising a micro optical sensor for sensing a transmitting light beam transmitting through the beam splitter.

13. The optical transceiver module in claim 9, wherein the refractive index of the first light-guide element is between 1.12 and 2.08.

14. The optical transceiver module in claim 9, wherein the beam splitter is a filtering plate, an optical film, an optical resin or an optical cement.

15. The optical transceiver module in claim 9, wherein a light emitting surface of the beam splitter comprises a plurality of micro-structures.

16. The optical transceiver module in claim 9, wherein a protrusive portion is formed on the first surface, the optical element corresponds to the protrusion portion.

17. The optical transceiver module in claim 9, wherein a recess is formed on the first surface, the beam splitter is contacted with the recess.

* * * * *